(12) United States Patent
Pauken et al.

(10) Patent No.: US 8,153,258 B2
(45) Date of Patent: Apr. 10, 2012

(54) MOLDED ASSEMBLY HAVING A REDUCED TENDENCY TO SQUEAK AND A METHOD OF MANUFACTURING THE ASSEMBLY

(75) Inventors: Junko K. Pauken, Canton, MI (US);
Norman Haidous, Wayne, MI (US);
Martin Arthur Trapp, Novi, MI (US);
Robert S. Parsons, Saline, MI (US);
Gary D. Mullen, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1217 days.

(21) Appl. No.: 11/869,888

(22) Filed: Oct. 10, 2007

(65) Prior Publication Data

US 2009/0096234 A1   Apr. 16, 2009

(51) Int. Cl.
*B60R 13/00* (2006.01)
*B32B 9/04* (2006.01)

(52) U.S. Cl. ........................ 428/411.1; 428/31

(58) Field of Classification Search ................ None
See application file for complete search history.

(56) References Cited

U.S. PATENT DOCUMENTS

| | | | |
|---|---|---|---|
| 4,630,332 A | 12/1986 | Bisbing | |
| 4,663,381 A | 5/1987 | Blumel | |
| 5,264,270 A | 11/1993 | Agrawal | |
| 5,916,075 A * | 6/1999 | Tanaka et al. | 49/441 |
| 6,576,699 B2 | 6/2003 | Nakagawa et al. | |
| 6,623,688 B2 | 9/2003 | Gedritis et al. | |
| 6,966,594 B2 | 11/2005 | Wojewnik | |
| 7,152,898 B2 | 12/2006 | Augustyniak | |
| 2002/0091182 A1 * | 7/2002 | Venkataswamy et al. | 524/186 |
| 2002/0151642 A1 | 10/2002 | Nakagawa et al. | |

FOREIGN PATENT DOCUMENTS

WO   0118108 A1   3/2001

* cited by examiner

*Primary Examiner* — Sheeba Ahmed
(74) *Attorney, Agent, or Firm* — Brooks Kushman P.C.

(57) ABSTRACT

The invention relates to a molded assembly having reduced squeaking and rattling. The molded assembly includes a first component of a vehicle that has a first surface. The assembly also includes a second component of a vehicle having a second surface. The second component is assembled to the first component. An isolator is disposed between the first and second components and is secured to the first surface. The isolator comprises an injection-moldable self-lubricating elastomer impregnated with a fatty amide. An interface between the isolator and the second surface has a ratio of a co-efficient of static friction to a co-efficient of dynamic friction less than 1.4.

20 Claims, 1 Drawing Sheet

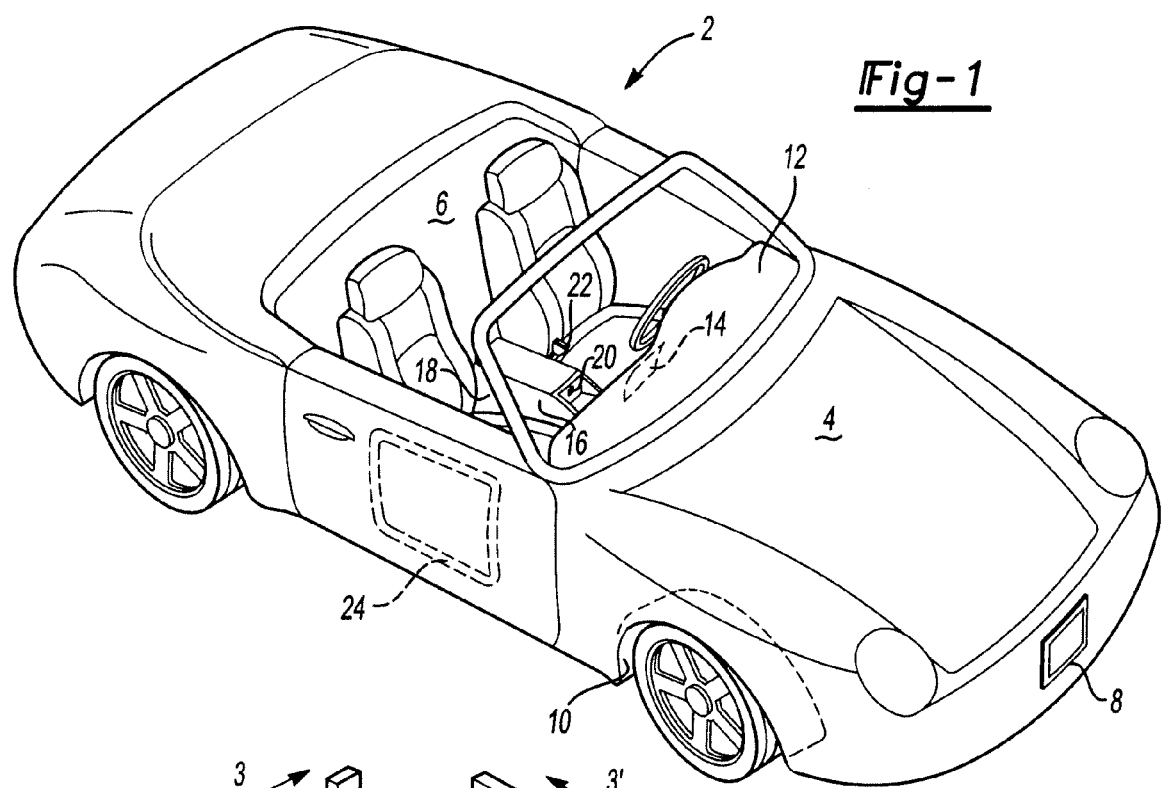
_Fig-1_
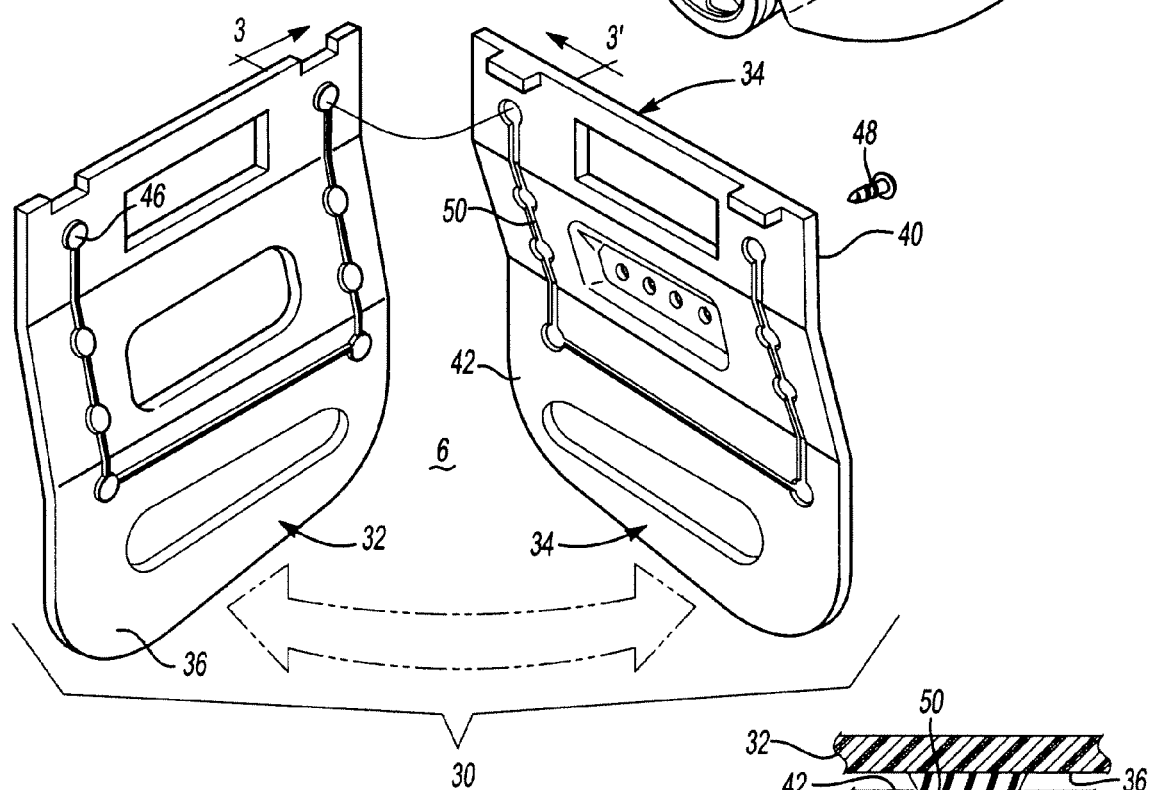
_Fig-2_
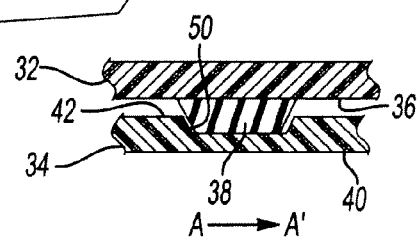
_Fig-3_

US 8,153,258 B2

MOLDED ASSEMBLY HAVING A REDUCED TENDENCY TO SQUEAK AND A METHOD OF MANUFACTURING THE ASSEMBLY

BACKGROUND OF THE INVENTION

1. Field of the Invention

The invention relates to a molded assembly and a method of manufacturing the molded assembly with a reduced tendency to squeak or make other objectionable noises.

2. Background Art

It is generally desirable to reduce the noise level in the interior of a vehicle. Noise particularly arises during times when the vehicle body is torqued or vibrates from changes in the vehicle's velocity or when riding over uneven roads. Annoying noises and squeaks often occur in areas where two or more components of an assembly meet.

When there are two identical materials in contact with each other, the ratio of the coefficient of static friction to the coefficient of dynamic friction may be relatively high. When the ratio is relatively high, motion between the two surfaces may occur as an intermittent stick-slip motion yielding a squeak.

Vehicle designers generally seek to use as many similar materials for components and subassemblies as possible to simplify interior integration and part matching. In addition, regulations about the end life reclamation of cars and other products favor the use of fewer and more homogeneous materials.

Previously, designers added flocked tape, felt tape, foam tape or silicone to a part edge or contact position in an attempt to minimize squeaks and rattles. The material frequently was applied in a secondary operation, typically by hand or by use of a guide tool. These types of secondary operations frequently lack repeatability and control in positioning the isolator material, especially when applied by hand.

Another significant problem of using adhesives and tapes is that these materials may creep over time. Creep results in the tape applied to the back of a part slowly moving around the edge of the part and becoming exposed to the view of a customer. Creep is accelerated when the vehicle experiences high temperature that may soften the adhesive or when the vehicle receives prolonged or severe vibration.

There is a need for a molded assembly and method for making such a molded assembly that reduces squeaks and rattles. The assembly should be economical, simple to manufacture, less susceptible to extreme environmental conditions, and allow the use of similar or identical materials in assembled components.

SUMMARY OF THE INVENTION

The invention relates to a molded assembly having reduced squeaking and rattling. The molded assembly includes a first component of a vehicle that has a first surface. The assembly also includes a second component of a vehicle having a second surface. The second component is assembled to the first component. An isolator is disposed between the first and second components and is secured to the first surface. The isolator comprises an injection-moldable self-lubricating elastomer impregnated with a fatty amide. An interface between the isolator and the second surface has a ratio of a coefficient of static friction to a coefficient of dynamic friction of less than 1.4.

In another embodiment, a molded assembly is made up of first and second components. The first component has a B surface and the second component has a receiving zone. The first component includes an upstanding rib that is bonded to the B surface and extends from the B surface towards the receiving zone. The rib is formed of an injection molded thermoplastic vulcanizate impregnated with a fatty amide. An interface between the rib and the receiving zone, when assembled, has a ratio of a coefficient of static friction to a coefficient of dynamic friction of less than 1.4.

In another embodiment, a molded assembly is manufactured by the method of injection molding a first part in a first mold which defines a first cavity. The first part has a first engagement element. A barrier within the first mold moves to define a second cavity. The second cavity is smaller than and is in fluid communication with the first cavity. A self-lubricating elastomer impregnated with a fatty amide is injected into the second cavity and the elastomer is bonded to the first part. A second part is provided that defines a second engagement element. The first part and the second part are assembled with the first and second engagement elements in a contacting relationship.

BRIEF DESCRIPTION OF THE DRAWINGS

FIG. 1 is a perspective view of a vehicle having several examples of assemblies that may be made according to different embodiments of the present invention;

FIG. 2 is an exploded perspective view of one example of a component assembly made according to an embodiment of the present invention; and FIG. 3 is a cross-sectional view taken along the line 3-3 in FIG. 2.

DETAILED DESCRIPTION OF THE PREFERRED EMBODIMENT(S)

Reference is made in detail to compositions, embodiments and methods of the present invention. It should be understood that the disclosed embodiments are merely exemplary of the present invention, which may be embodied in various alternative forms. The specific details disclosed in the following detailed description are not to be interpreted as limiting, but merely as a representative basis for teaching one skilled in the art how to practice the present invention.

Except where expressly indicated, all numerical quantities in this description indicating the amounts of material or conditions should be understood as being modified by the word "about" in describing the broadest scope of the present invention.

Referring to FIG. 1, a vehicle 2 is illustrated that has an exterior 4 and an interior that defines a passenger compartment 6. The vehicle 2 has component assemblies on the exterior such as a license plate holder 8 and a wheel well liner 10 from which squeaks and rattles may emanate. The interior passenger compartment 6, has component assemblies comprising a dashboard 12 that includes a center panel 14, which is a non-limiting example of an assembly susceptible to squeaking and rattling. Further examples of squeak and rattle prone interfaces may include a console lid to console base region 16, a console to an interior part zone 18, a plastic latch assembly 20, a seat belt buckle to either a seat side shield, the console, or a seat component 22, or a door trim bezel to door trim interface 24. These assemblies 8, 10, 14, 16, 18, 20, 22, and 24 and many other types of assemblies may include two or more subassemblies or individual parts which must be mated.

Any material used in these mated assemblies 8, 10, 14, 16, 18, 20, 22 and 24 may be characterized by a coefficient of static friction and a coefficient of dynamic friction. Static friction represents the amount of force needed before a motionless object can be put into motion. Dynamic friction represents the amount of resistance to movement that is already underway. Familiar examples of dynamic friction are sliding friction and drag. At the molecular level, both static and dynamic friction arise from electromagnetic interactions between molecules of the two surfaces, analogous to being sticky. A coefficient of friction whether static or dynamic, describes the ratio of the friction between two components relative to the force pressing them together. The coefficient must be measured and cannot be calculated. The measurement methods vary by the materials involved. Regarding plastics these ratios of coefficients are measured using either slip-stick effects or contacting pairs of materials to precisely controlled interference and motion.

The ratio of the coefficient of static friction to the coefficient of dynamic friction may indicate when a slip-stick movement will occur between materials in contact with each other. When the ratio exceeds 1.35-1.40, a squeak may be heard as measured by human observation inside the passenger compartment 6 of the vehicle 2. Assemblies with materials that are relatively stiff often have ratios exceeding 1.40. One example of a stiff material is acrylonitrile-butadiene-styrene (ABS). One grade of ABS has a tensile modulus of exceeding 320 ksi and a flexural modulus of elasticity exceeding 320 ksi at 73 F when measured using ASTM D638 and D790, respectively.

Referring to FIG. 2, an embodiment of an interior center finish panel assembly 30 is illustrated in exploded view. The assembly 30 includes a back part 32 and a front part 34. The back part 32 has at least one B surface 36. The B surface is one not intended to be visible to a passenger during normal operation of the vehicle. As such, the B surface may have an aesthetic blemish like an area of high surface porosity, an area of non-uniform coloration, and/or a sink mark. An isolator 38 is molded to the B surface of the back part. In this embodiment, the isolator is an upstanding rib. The isolator 38 is intended to physically separate surfaces that may have nearly identical composition and/or have the ratio of the coefficient of static friction to the coefficient of dynamic friction sufficiently elevated to cause a squeak. The isolator 38 may be formed by dual-shot injection molding of a self-lubricating elastomer impregnated with a fatty amide, the shot being injected after a first injection of plastic forms the back part 32. It is understood that the isolator 38 may also be formed by over-molding a part in a sequential molding operation that may be interrupted by additional operations such as in-mold priming and/or robotic insertion of fasteners. The back part 32 optionally may have at least one fastener receptacle 46.

It is understood that the isolator 38 may be formed as a continuous rib, as shown, or as a discontinuous series of ribs, and/or as isolated dots without departing from the spirit of the invention.

The front part 34 has an A surface 40 and a B surface 42. The A surface 40 of the center finish panel faces the passenger compartment 6 in the center of the dashboard 12. The B surface 42 includes a receiving channel 50 open to the B surface and fitted to mate with the isolator 38. It is understood that the receiving channel 50 may be a continuous, a discontinuous, or a dotted channel which may be determined by the layout of the isolator 38.

The B surface 42 also may contain at least one fastener 48 for securing the front part 34 to the back part 32. The fastener 48, if present, should align with the fastener receptacle 46. Non-limiting examples of the fastener 48 may include a screw, a snap-fit arm, a spring clip, a barbed insert, a heat stake operation or other fasteners known in the art.

Referring to FIG. 3, a fractional cross-sectional view of an assembly 30 having the front part 34 and the back part 32 taken along the line 3-3 in FIG. 2. An upstanding rib 38 is bonded to the B surface 36 of the back part 32. The upstanding rib 38 cooperates with the receiving groove 50 on the B surface 42 of the front part 34. The receiving groove 50 accepts the upstanding rib 38 allowing the upstanding rib 38 to contact a portion of the front part 34. The upstanding rib 38 is of sufficient height to prevent the front part 34 from contacting the back part 32 effectively isolating the front part 34 from the back part 32. A benefit of the molded rib 38 is that the design tolerances may be as much as three times better, that is, relatively smaller, than when ethylene propylene diene monomer (EPDM), rubber, or oil-enhanced EPDM are used.

The back part 32 comprises an injection molded plastic. The plastic may include a thermoset or a thermoplastic. The plastic may optionally be filled or reinforced. It is understood that coatings or decoration may also be applied to the back part 32 as needed for functionality or aesthetics without departing from the spirit of this invention.

Although illustrated in the embodiment of FIGS. 2 and 3 a receiving element 50 is optional. The isolator 38 may be an over-molded section formed along a contacting surface of the back part 32 including surfaces having texture or surfaces that are angular, even shear faces. The rib 38 comprises an injection moldable plastic. The rib plastic is of a different formulation from the plastic of the back part 32. Non-limiting examples of the plastic for the rib 68 include a self-lubricating elastomer, a thermoplastic elastomer, a thermoplastic vulcanizate, such as VYRAM (Advanced Elastomeric Systems, Akron, Ohio) or UNIPRENE (Teknor Apex, Pawtucket, R.I.), a thermoplastic dynamic vulcanizate alloy, a thermoplastic vulcanizate having a semi-interpenetrating polymer network, and/or a SANTOPRENE (Advanced Elastomer Systems, Akron, Ohio) plastic. The rib 38 plastic is impregnated with a fatty amide. The impregnation of the plastic of the rib 38 with the fatty amide occurs during a melt phase prior to injection of the rib 38 plastic on to the back part 32.

The rib 38 may have a hardness independently selected from Shore A values of 35, 40 and 50 to Shore D values of 39 and 50 when measured at 0.120 inch thickness using ASTM D-2240-00. The specific gravity may range from a relatively closed cell 0.2 to a relatively solid 0.97. Open cell foamed plastics are also contemplated.

The fatty amide comprises a relatively long acyl chain with one or more amide groups attached near one end of the chain. The opposite end of the chain may be grafted, entangled, bonded, or otherwise associated with the backbone polymers of the continuous thermoplastic elastomer matrix. The relatively long chain comprises the chain selected independently from, but is not limited to, $C_{12}$-$C_{22}$ carbon acyl chains derived from fatty acids or esters of fatty acids. The carbon chains may be unsaturated, polyunsaturated, or saturated without exceeding the scope of this invention. Non-limiting examples of these fatty amides are the KEMAMIDE (Chemtura Corporation, Middlebury, Conn.) fatty amides, including, but not limited to, an oleyl palmitamide secondary fatty amide, an unsaturated monoamide from a vegetable erucic acid, and/or a fatty bisamide synthetic wax.

In order to process the assembly of FIG. 2, a molding cycle uses a dual-shot injection mold having a first cavity which is injected with a molten plastic to form the back part 32 of the assembly using a high pressure injection molding machine. The back part 32 is allowed to solidify. Within the mold, a barrier, such as a slide, retracts creating a second cavity partially formed by the back part 32. The molten self-lubricating elastomer is injected to the second cavity to form the isolator 38 that is bonded to the B surface 36 of the back part 32. In at least one embodiment, the self-lubricating elastomer includes the thermoplastic vulcanizate co-melted and/or melt blended with the fatty amide. The isolator 38 is allowed to solidify. The mold is opened to remove the subassembly having the back part 32 and the bonded isolator 38 which completes the molding cycle. The front part 34, previously made in a separate process such as molding in a different tool or a stack mold, is aligned with the subassembly comprising the back part 32 and the isolator 38. The front part 34 and the back part 32 are secured together with the isolator 38 disposed between the two parts.

It is understood that embodiments of the molding cycle may include releasing or increasing pressure between closed mold halves or even slightly opening the mold halves for a brief time to "breathe" before reclosing and injecting the second shot.

It is further understood that the injection molding process may include any of the injection processes known in the art. Non-limiting examples of the process include low pressure injection molding with exothermic or endothermic blowing agents, gas-assisted high pressure injection molding, and injection molding using hot runners on the mold, including micro-hot runners for isolator dots. It is also understood that instead of a slide in the mold, the isolator 38 could be injected into a different mold half that is substituted for the mold half not containing the back part 32.

While FIG. 2 illustrates bonding the isolator 38 to the B surface 36 of the back part 32, it is understood that it also possible to bond the isolator 38 to the B surface 42 of the front part 34 or even the A surface 40 of the front part 34.

Example 1

A SANTOPRENE plastic may be melt blended with 0.5 wt. % KEMAMIDE S fatty amide, which is a saturated fatty primary monoamide derived from stearic acid. Additional samples may be prepared with 1 wt. %, 2 wt. %, 3 wt. % and 3.5 wt. % KEMAMIDE S. One sample containing 3.5 wt. % KEMAMIDE S fatty amide did not blend homogeneously and as a consequence had excessive variation in resistance to squeak when molded as a rib. The ribs molded from the 1, 2 and 3 wt. % KEMAMIDE S samples suppressed audible squeak and rattle when molded to a back part comprised of polypropylene. When the samples are mated with a front part comprising polypropylene, they were tested on a Ziegler SSP stick-slip prufstand test apparatus which yields a Risk Priority Number indicating the likelihood of stick-slip effects that emit annoying noises. The sample having 0.5 wt. % KEMAMIDE S fatty acid exhibited a relatively high risk priority number indicating that stick-slip effects are present and are likely to cause annoying noises. The samples having 1, 2, and 3 wt. % KEMAMIDE S yielded risk priority numbers suggesting that annoying noises are not likely.

Example 2

Test samples are made by injection molding a polypropylene back part and using a dual-shot injection of a rib that is then contacted with a front part plate plaque. The test sample is tested with a material compatibility test system for squeak and itch (MB Dynamics, Cleveland, Ohio) which records the sound and predicts noise generating tendencies. When the interface of the rib and the front part plaque has a ratio of the coefficient of static friction to the coefficient of dynamic friction of less than or equal to 1.4, no squeak is observed. Above the ratio of 1.4, squeaking is heard. The material compatibility test system measures velocities between any two parts of in the range of 0.5-380 mm per second peak velocity. In addition, it can also accommodate a constant interference up to 20 mm. This distance can account for gaps and interferences that are typical in assembled vehicles.

Example 3

Test samples of Example 2 are tested on the same squeak and itch compatibility test equipment and meet the acceptance criteria of the Society of Automotive Engineers (SAE) standard J2759.

While the best mode for carrying out the invention has been described in detail, those familiar with the art to which this invention relates will recognize various alternative designs and embodiments for practicing the invention as defined by the following claims.

What is claimed is:

1. A molded assembly having reduced squeaking and rattling for use with a vehicle, the assembly comprising:
    a moldable plastic part of the vehicle, having a surface;
    a component of the vehicle having a surface and a receiving channel, the component being assembled to the moldable plastic part; and
    a moldable isolator disposed between the moldable plastic part and the component, the isolator being configured to be molded to the surface of the moldable plastic part, the isolator comprising an elastomer and a fatty amide, wherein the receiving channel is adapted to receive the isolator forming an interface, the interface between the isolator and the surface of the component has a ratio of a coefficient of static friction to a coefficient of dynamic friction less than 1.4.

2. The assembly of claim 1, wherein the moldable isolator comprises a rib.

3. The assembly of claim 2, wherein the receiving channel cooperates with the rib.

4. The assembly of claim 1, wherein the isolator comprises at least two isolated dots.

5. The assembly of claim 1, wherein the isolator has a durometer ranging from 35 Shore A to 39 Shore D 'when measured according to ASTM D-2240-00 the ratio ranges from 1.0 to 1.3.

6. The assembly of claim 1, wherein the fatty amide comprises 1-3 wt. % of the elastomer forming the isolator having a durometer ranging from 35 Shore A to 39 Shore D when measured according to ASTM D-2240-00.

7. The assembly of claim 6, wherein the fatty amide comprises a $C_{12}$-$C_{22}$ acyl chain.

8. The assembly of claim 6, wherein the fatty amide comprises a secondary fatty amide.

9. The assembly of claim 1, wherein the moldable plastic part has a composition that is selected from the group consisting of thermoplastic plastic, a thermoset plastic, a plastic alloy and a plastic composite.

10. A molded assembly having reduced squeaking and rattling, for use with a vehicle, the assembly comprising:
    a first component of the vehicle, the first component having a B surface;
    a second component of the vehicle having a second surface including a receiving zone;
    wherein the first component includes an upstanding rib bonded to the B surface and extending from the B surface toward the receiving zone, the rib comprising an injection-moldable thermoplastic vulcanizate and a fatty amide, the rib having a durometer ranging from 35 Shore A to 39 Shore D when measured according to ASTM D-2240-00, wherein an interface between the rib and the receiving zone, when assembled, has a ratio of a coefficient of static friction to a coefficient of dynamic friction ranging from 1 to 1.4.

11. The assembly of claim 10, wherein the fatty amide is present in an amount ranging from 0.5 wt. % to 3.5 wt % of the thermoplastic vulcanizate.

12. The assembly of claim 10, wherein the rib is includes an overmolding.

13. The assembly of claim 10, wherein the thermoplastic vulcanizate includes a semi-interpenetrating polymer network of an elastomeric material.

14. The assembly of claim 10, wherein the the rib is adapted to prevent exuding the fatty amide to the interface.

15. The molded assembly of claim of claim 5, wherein the fatty amide is present in an amount ranging from 0.5 wt. % to 3.5 wt. % of the isolator.

16. A molded assembly having reduced squeaking and rattling for use with a vehicle, the assembly comprising:
    a moldable plastic part of the vehicle having a first surface and a first composition;
    a component of the vehicle having a second surface facing the first surface and having a second composition, the second composition having a ratio of a coefficient of static friction to a coefficient of dynamic friction relative to the first composition effective to have a squeak when measured according to SAE standard J2759; and
    an isolator having a third composition having a specific gravity ranging from 0.2 to 0.97, the isolator being thermally bonded to the plastic part and contacting the component of the vehicle, the isolator suppressing the squeak, wherein the third composition includes a fatty amide uniformly dispersed in an elastomer such that the third composition has a durometer ranging from 35 Shore A to 39 Shore D when measured according to ASTM D-2240-00.

17. The assembly of claim 16, wherein a portion of the molded plastic part is spaced apart from a portion of the component and the isolator is connected to both the first and second components when the molded plastic part and the component of the vehicle are mated together.

18. The assembly of claim 16, wherein the component of the vehicle includes a receiving channel that cooperates with the isolator.

19. The assembly of claim 16, wherein the third composition includes the fatty amide in an amount ranging from 1 wt. % to 3.5 wt. % of the third composition.

20. The assembly of claim 16, wherein the isolator comprises a foam.

* * * * *